UNITED STATES PATENT OFFICE 2,108,886

SULPHAMIC ACID SUBSTANCE

Fritz Guenther and Hermann Holsten, Ludwigshafen-on-the-Rhine, Germany, assignors to I. G. Farbenindustrie Aktiengesellschaft, Frankfort-on-the-Main, Germany No Drawing. Application November 14, 1935, Serial No. 49,841. In Germany April 28, 1930

12 Claims. (Cl. 260—124)

This application is a continuation-in-part of our application Ser. No. 532,992, filed on April 25th, 1931.

The present invention relates to the production of assistants for the textile and related industries.

We have found that valuable wetting, cleansing and dispersing agents as well as auxiliary agents for all branches of the textile and leather industries can be obtained by converting amines which contain at least one aliphatic, i. e. open chain or cycloaliphatic, radicle having more than 8 carbon atoms and which contain directly attached to an amino nitrogen atom at least one hydrogen atom, into sulphamic acids (which contain the grouping =N—SO₂OH), or their water-soluble salts respectively. The amines may, besides the aliphatic radicle with more than 8 carbon atoms, contain any further radicles, for example alkyl (including cycloalkyl) groups or aryl groups. They may be substituted, for example by further amino groups, by carboxyamido, carboxyl, hydroxyl, aryl groups or halogen. The reaction may be effected by sulphonating the amines according to the usual methods for the preparation of sulphamic acids. The usual sulphonating agents stronger than sulphuric acid, such as oleum, sulphur trioxide, chloro or fluorosulphonic acid and sulphuryl chloride, if desired with the addition of substances removing water or hydrogen halides, such as organic or inorganic anhydrides as for example acetic or phosphoric anhydrides, may be employed. Mixtures of concentrated sulphuric acid with one or more of the aforesaid anhydrides may also be employed. The co-employment of organic diluents inert to the sulphonating agents and amines under the conditions of working, such as diethyl ether, trichlorethylene, chloroform, or especially of tertiary bases, such as trialkyl amines, pyridine, dimethylaniline and the like, as such or in conjunction with the aforesaid solvents renders it possible to carry out the reaction with good yields and under especially mild conditions, such as below 80° C. so as to avoid losses by oxidation and decomposition. When employing sulphuryl chloride, the reaction products first formed, such as sulphamic chlorides or sulphamides, must be converted by hydrolysis into the free acids or their salts. The amount of sulphonating agent in cases when the compound to be sulphonated contains double linkages, hydroxyl groups or aromatic radicles should be so selected that in so far as a sulphonation on a carbon or oxygen atom can take place under the reaction conditions chosen, a quantity of sulphonating agent is present which exceeds that reacting with the said groups and suffices to form the sulphamic acid. If materials are to be sulphonated which contain unsaturated radicles the reaction is carried out with advantage in the presence of tertiary bases whereby the formation of such products as contain the sulphur connected to a carbon atom is suppressed; in this case the sulphonation can often be effected in an advantageous manner by means of fluorosulphonic acid.

Products which are especially suitable as washing and cleansing agents are obtained when the high molecular fatty acids contained in vegetal fats, i. e. vegetable or animal solid or liquid fats, are converted into amines, as for example by catalytic hydrogenation of acids or nitriles or by the Hofmann degradation, or when mineral acid esters of the alcohols obtainable from oils and fats by catalytic hydrogenation are converted into amines with ammonia or primary amines as for example cetyl iodide with ammonia or primary amines, or when acid amides which still contain primary or secondary amino groups, such as mono-palmitoyl ethylene diamine (R—CO—NH—C₂H₄—NH₂), are converted into sulphamic acids in the manner described so that chains of from 10 to 18 carbon atoms are connected to a nitrogen atom. Compounds containing amino groups as well as acid amido groups are liable to be sulphonated on the amino groups when treated according to the present invention, in so far as replaceable hydrogen is attached to the amino nitrogen atoms. The lower members of this series containing from 8 to 12 carbon atoms yield excellent wetting and penetrating agents. Similar products may also be obtained by introducing high molecular organic radicles, as for example alkyl or cycloalkyl radicles, into the sulphamic acids of low molecular compounds as for example ethyl sulphamic acid.

The amines obtainable by reducing the acid amides of mixed aromatic-aliphatic carboxylic acids containing at least 8 carbon atoms in a non-aromatic chain as for example phenyl stearic acid

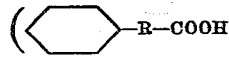

obtainable from benzene and oleic acid with the aid of aluminium chloride), of resinic and naphthenic acids and also those of carboxylic acids from the destructive oxidation of paraffin wax with the aid of oxygen, nitrogen oxides or nitric acid give valuable products. The products obtained are valuable auxiliary agents for the industries which work up textiles and other fibrous materials as well as for all other purposes of industrial and daily use in which use is made of wetting, cleansing and emulsifying power.

The sulphamic acids obtained may be employed alone or together with other wetting, cleansing and emulsifying agents, such as soaps, products similar to Turkey red oil, salts of sulphonic acids of aromatic and aliphatic nature, as for example alkylated naphthalene sulphonic acids, sulphonic acids from mineral oils, fatty acids, sulphonic acids from acids of vegetable and animal fats or oils or alcohols such as cetyl or dodecyl alcohols, or sulphuric esters of higher fatty alcohols, as for example of cetyl or dodecyl alcohols or the alcohols obtainable by reducing the carboxyl groups of acids of vegetable or animal fats or oils or of the glycerides, with high molecular amines, such as dodecyl or pentadecyl amines, with hydroxy-alkylamines, as for example ethanol, N-dodecyl N-ethanol or like amines, quaternary ammonium bases and their salts, such as trimethyl dodecyl ammonium sulphate or N-dimethyl N-ethanol N-dodecyl ammonium sulphate, or in conjunction with organic solvents, such as methyl cyclohexanol, tetrahydronaphthalene, ethylene glycol cresyl ether, trichlorethylene, or with protective colloids, such as glue, gelatine, starch, and vegetable mucilages, or with salts, such as sodium carbonate, sodium bicarbonate, waterglass, common salt, Glauber's salt, phosphates, such as meta or pyro sodium phosphate or bleaching agents, such as perborates, percarbonates, paratoluene sulpho-chloramide sodium salt and the like. The addition of the said agents depends on the purpose in view. Preparations which contain several of the said additions may frequently be employed with advantage. The free sulphamic acids are not employed for neutral baths if these are to be heated to about their boiling point, or for baths containing free acids; their salts with alkalies, such as alkali metals, ammonia or organic bases, such as mono-, di- or trimethylamine, ethanolamine, pyridine and aniline may, however, be usefully applied with neutral baths.

The following examples will further illustrate the nature of this invention but the invention is not restricted to these examples. The parts are by weight.

*Example 1*

25 parts of chlorsulphonic acid are introduced at from 5° to 15° C. into 100 parts of pyridine and 40 parts of chloroform while cooling, and 25 parts of pentadecylamine are then added. The reaction mixture is then heated for about 4 hours at from about 50° to 55° C. until a sample dissolves in water giving a clear solution which remains clear when alkali is added. The whole is then stirred into dilute caustic soda solution and the pentadecylsulphamic acid sodium salt corresponding to the formula $C_{15}H_{31}NHSO_3Na$ which separates in the solid state is filtered off by suction.

Woolen piece goods are washed for 15 minutes at from 60° to 70° C. in an aqueous solution of 2 parts of the sodium salt obtained in each 1000 parts of water. Excellently washed goods are obtained which have suffered no injury to the fibres in spite of the high temperature.

*Example 2*

12 parts of decylamine are dissolved in 50 parts of pyridine and 20 parts of chloroform, whereupon 15 parts of chlorsulphonic acid are slowly introduced. After stirring for 2 hours at from 70° to 75° C. the reaction mixture is poured into a solution of 40 parts of 10—n aqueous caustic soda solution in water, whereupon the aqueous solution is evaporated to dryness or it is salted out and filtered off. It is the sodium salt of decylsulphamic acid corresponding to the formula $C_{10}H_{21}NHSO_3Na$.

By adding 5 parts of the salted out product to 25 parts each of water and of 96 per cent aqueous ethyl alcohol and dissolving the whole in 1000 parts of a mercerizing liquor of 32° Bé. strength, a mercerizing liquor is obtained which possesses a high wetting and shrinking power to cotton and consequently allows of performing the mercerization in a very short time.

*Example 3*

200 parts of a mixture of amines obtainable by reduction of the mixture of nitriles corresponding to the fatty acids contained in palm kernel oil (consisting substantially of amines containing from 8 to 18 carbon atoms per molecule) are slowly introduced into a mixture of 1000 parts of pyridine, 400 parts of chloroform and 250 parts of chlorosulphonic acid. The mixture is heated at about from 50° to 55° C. until a sample dissolves in water giving a clear solution and then worked up as described in Example 1.

*Example 4*

300 parts of 9.10-octodecenylmethylamine (obtainable by reacting the sulphuric ester of olein alcohol with methylamine) are dissolved in 1500 parts of ethyl alcohol and 234 parts of fluorosulphonic acid ammonium salt are added. The mixture is heated under reflux to boiling while the reaction of the mixture is kept slightly alkaline to phenolphthalein by addition of suitable portions of soda lye of 40° Bé. strength. Sodium fluoride and other inorganic salts precipitated are removed by filtration and the filtrate is evaporated to dryness on the water-bath. The product thus obtained is an excellent washing agent for woolen goods.

*Example 5*

350 parts of mono-oleyl-N-N'-dimethylethylenediamine corresponding to the formula

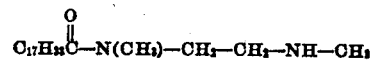

are treated with fluorosulphonic ammonium salt in the manner described in Example 4, the compound corresponding to the formula

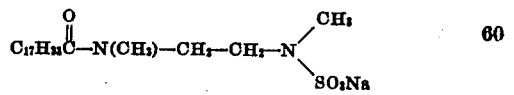

thus being obtained. The product has an excellent foaming and dispersing power and is very stable to the constituents causing the hardness of water.

*Example 6*

150 parts of octodecyl hydroxyethylamine are dissolved in 500 parts of ethyl alcohol and treated with 120 parts of fluorosulphonic acid sodium salt in the manner described in Example 4. The product obtained is an excellent softening agent for viscose artificial silk.

Example 7

100 parts of N-dodecyl-m-chloraniline corresponding to the formula $$C_{12}H_{25}-NH-\underset{Cl}{\bigcirc}$$

are dissolved in 500 parts of pyridine and a mixture of 120 parts of chlorosulphonic acid and 80 parts of diethylether are slowly added. The mixture is stirred at room temperature until the reaction product has become water-soluble, and worked up as described in Example 1. The product is a good wetting agent which can be employed also in acid baths.

Example 8

30 parts of 9.10-octodecenyl glycocoll $$(C_{18}H_{35}NHCH_2CO_2H),$$

obtainable by saponifying the reaction product of oleylamine with formaldehyde and hydrocyanic acid, are dissolved in 200 parts of ethyl alcohol. 30 parts of fluorosulphonic acid sodium salt and such an amount of caustic soda solution are added that the reaction mixture is alkaline to phenolphthalein. It is heated to boiling under reflux for from 10 to 12 hours, the reaction being always kept alkaline to phenolphthalein by gradual addition of caustic soda solution. The solid parts which have precipitated are removed by filtration and the alcohol is distilled off. The product obtained has a good wetting power.

In an analogous manner the compound $$C_{12}H_{25}-\underset{|}{\overset{SO_3H}{N}}-CH_2-CO_2H$$

can be prepared by saponifying the reaction product from dodecylamine, formaldehyde and hydrocyanic acid and reacting the saponification product with fluorosulphonic sodium salt.

Example 9

300 parts of abietenylamine (obtainable by reducing the nitrile of abietic acid) are reacted with 250 parts of fluorosulphonic acid sodium salt in alcoholic-alkaline solution in an analogous manner as described in Example 4. By filtering off the solid parts and evaporating the filtrate to dryness a product is obtained which is a good wetting agent.

Example 10

10 parts of mono-lauroylethylenediamine are added to a mixture of 50 parts of pyridine, 25 parts of chloroform and 15 parts of chlorosulphonic acid. The mixture is stirred for 3 hours at from 50° to 60° C. The mass is then poured into 300 parts of a 10 per cent potassium chloride solution. The reaction product precipitated is filtered off and potassium carbonate solution is added thereto until the reaction is faintly alkaline. By evaporating the mass to dryness a pulverable potassium salt is obtained which has probably the following composition:

$$C_{11}H_{23}CONHC_2H_4NHSO_3K$$

Viscose artificial silk is handled for from 5 to 10 minutes in a bath containing 2 parts of the said product per each 1000 parts of water. The material is then centrifuged and dried. It possesses a soft and supple touch.

What we claim is:—

1. A sulphamic acid substance derived by substitution of a $-SO_3X$ group, wherein X is a substituent selected from the group consisting of hydrogen and a salt-forming radicle, for a hydrogen atom in the amino group of an organic amine containing at least one aliphatic radicle with at least 8 carbon atoms.

2. A sulphamic acid substance derived by substitution of a $-SO_3X$ group, wherein X is a substituent selected from the group consisting of hydrogen and a salt-forming radicle, for a hydrogen atom in the amino group of an organic amine containing at least one aliphatic radicle with from 8 to 18 carbon atoms.

3. A sulphamic acid substance derived by substitution of a $-SO_3X$ group, wherein X is a substituent selected from the group consisting of hydrogen and a salt-forming radicle, for a hydrogen atom in the amino group of an organic amine containing at least one aliphatic radicle corresponding to an alcohol obtainable by reduction of a fatty acid of vegetal origin.

4. A sulphamic acid substance derived by substitution of a $-SO_3X$ group, wherein X is a substituent selected from the group consisting of hydrogen and a salt-forming radicle, for a hydrogen atom in the amino group of an organic amine containing at least one aliphatic radicle with at least 8 carbon atoms which amine is selected from the group consisting of unsubstituted amines and amines substituted by at least one of the substituents carboxyl, carbamido, amino, hydroxyl, aryl groups and halogen.

5. Sulphamic acid substances corresponding to the general formula $$R-N\diagdown_{SO_2X}^{R'}$$

wherein R stands for an aliphatic radicle with at least 8 carbon atoms, R' stands for a low molecular aliphatic radicle and X stands for a substituent selected from the group consisting of hydrogen and a salt-forming radicle.

6. Sulphamic acid substances corresponding to the general formula $$R-N\diagdown_{SO_3X}^{CH_3}$$

wherein R stands for an aliphatic radicle with at least 8 carbon atoms and X stands for a substituent selected from the group consisting of hydrogen and a salt-forming radicle.

7. Sulphamic acid substances corresponding to the general formula $$R-CO-\underset{|}{\overset{Y}{N}}-CH_2-CH_2-\underset{|}{\overset{Y}{N}}-SO_2X$$

wherein R stands for an aliphatic radicle with at least 8 carbon atoms, Y stands for a member selected from the class consisting of hydrogen atoms and organic radicles and X stands for a substituent selected from the group consisting of hydrogen and a salt-forming radicle.

8. Sulphamic acid substances corresponding to the general formula $$R-CO-\underset{|}{\overset{R'}{N}}-CH_2-CH_2-\underset{|}{\overset{R'}{N}}-SO_2X$$

wherein R stands for an aliphatic radicle with at least 8 carbon atoms, R' stands for a low molecular aliphatic radicle and X stands for a substituent selected from the group consisting of hydrogen and a salt-forming radicle.

9. Sulphamic acid substances corresponding to the general formula $$R-CO-N(CH_3)-CH_2-CH_2-N(CH_3)-SO_3X$$

wherein R stands for an aliphatic radicle with at least 8 carbon atoms and X stands for a substituent selected from the group consisting of hydrogen and a salt-forming radicle.

10. The compounds corresponding to the formula $$C_{17}H_{33}CON(CH_3)-CH_2-CH_2-N(CH_3)-SO_3X$$

wherein X stands for a substituent selected from the group consisting of hydrogen and a salt-forming radicle.

11. Pentadecyl sulphamic acid.

12. A composition of matter comprising essentially a sulfonic acid substance corresponding to the general formula $$R-N(CH_3)(SO_3X)$$

wherein R stands for the radicle of olein alcohol and X stands for a substituent selected from the group consisting of hydrogen and a salt-forming radicle.

FRITZ GUENTHER.
HERMANN HOLSTEN.